United States Patent Office 2,806,788
Patented Sept. 17, 1957

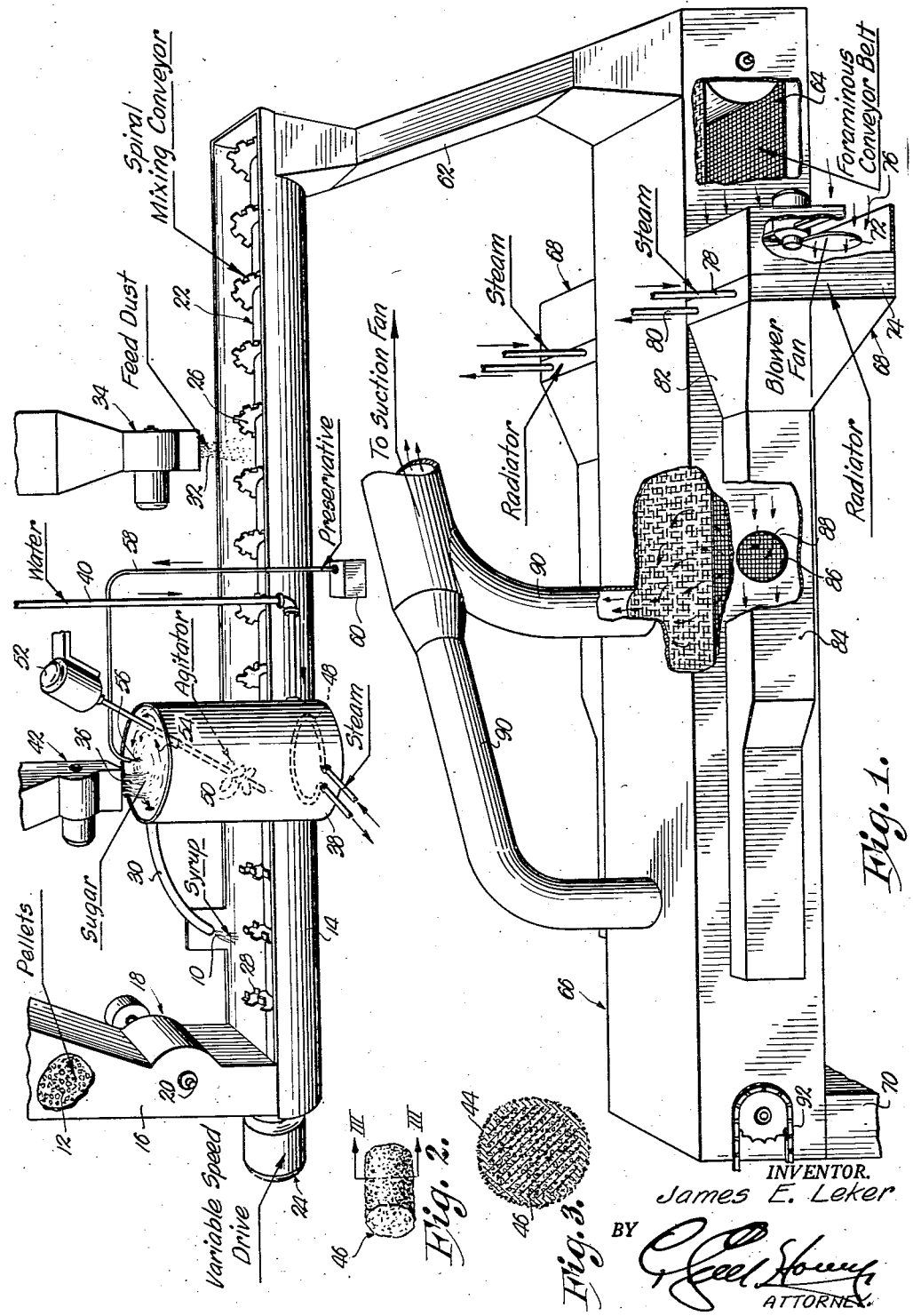

2,806,788

METHOD AND APPARATUS FOR COATING FEED

James E. Leker, Kansas City, Mo., assignor to Staley Milling Company, North Kansas City, Mo., a corporation of Missouri Application March 23, 1953, Serial No. 343,898

6 Claims. (Cl. 99—2)

This invention relates to a coated product, a novel method of carrying out the coating steps, and apparatus for making it possible to handle coating material otherwise not easily applied to the articles to be coated, the primary object being as just indicated, to overcome a problem that has heretofore not been successfully met and relating itself to handling of a relatively thick, syrupy solution to be used in the coating process.

In the mixed feed industry it is quite common today to market livestock feed in the form of pellets produced through well known methods that include extruding and fusing previously mixed materials which ultimately dry into a self-sustaining individual particle that is easily handled, packaged and fed, and which, by its initial manufacture, is not only nutritious but in great demand by the industry.

While commercialization of mixed feed in pellet form has met with complete success, there is a drawback in that some pellets are not sufficiently palatable for some animals and poultry and the feeder is confronted with the problem of inducing the animal to eat the pellets in sufficient quantity to provide the balanced diet that is desired. It follows therefore, that if means could be provided to render the pellets more palatable, this phase of the mixed feed industry could be developed into even greater importance and certainly the ultimate purchaser would quickly approve of a simple, inexpensive means of providing a balanced ration through a product which would be readily consumed by the livestock without added inducement.

It is the most important object of the present invention therefore, to provide a mixed feed pellet that has a coating thereon which of itself is nutritious, but more important, which is highly palatable and capable of inducing the livestock to eat the same.

Another important object of this invention is to provide a mixed feed pellet that has a coating of sugar thereon, which by its very sweetness, will render the pellet more palatable to some animals and poultry.

Another object hereof is to provide a method that will overcome the existing problems of providing a sugar coating on mixed feed pellets.

A further object hereof is the provision of a method of coating pellets with sugar that includes the steps of mixing the sugar in an aqueous solution and/or suspension that is extremely thick and unmanageable, but which can be successfully applied to the pellets through the novel method hereof.

A still further object of this invention is to provide a coating method that includes the steps of mixing sugar and water in a thick, viscid syrup and directing the syrup to the pellets by an overflow procedure as distinguished from other unsuccessful methods of causing a substance of this type to flow properly.

It is an important object of the present invention to include in a coating method the advancement and simultaneous tumbling of the pellets to be coated through the flowing coating substance.

Other objects of this invention include the way in which the pellet is provided with a powdery coating by a dusting procedure which takes place before the syrup dries; the way in which the viscid coating is dried in a forced air system; the manner of spreading the pellets in a thin layer and simultaneously advancing the same as hot air is forced through the layer; and the manner of providing novel apparatus for carrying out the method which includes structure for mixing the sugar and water, together with means for advancing and tumbling the pellets as well as the aforementioned drying system.

In the drawing:

Figure 1 is a schematic view showing apparatus for coating mixed feed pellets made according to the present invention and illustrating diagrammatically the method of this invention.

Fig. 2 is a perspective view of a coated, mixed feed pellet produced through use of the apparatus shown in Fig. 1 and by following the method herein contemplated; and Fig. 3 is an enlarged, cross-sectional view taken on line III—III of Fig. 2.

While the present invention has been perfected for use in the mixed feed industry, the problems solved hereby obviously have application in other fields and it is therefore, to be understood that reference hereinafter made to particular products or ingredients is for convenience of description only.

The invention, as above indicated, relates to applying a relatively heavy, syrupy solution 10, which has poor flow characteristics to pellets 12 for rendering the latter more palatable. Pellets 12 are produced through an extrusion process and while the same are relatively rigid and self-sustaining, they must be handled with some degree of care to avoid crushing and fragmenting.

It is to be understood that the pellets 12 may be made from any suitable food product or admixtures thereof, which mixing takes place prior to the pelleting procedure. The pellet mills used in such preliminary step are not herein illustrated since the same are well known and understood in the art.

In the method of the present invention, pellets 12 are directed into an elongated, preferably open top trough 14 from a source of supply such as a bin not illustrated, through a hopper 16 and past a metering valve within the hopper 16 disposed within housing portion 18. A rotating shaft 20 shown in Fig. 1 of the drawing, is a part of such metering valve in the housing portion 18 and such valve is capable of directing the pellets 12 into the trough 14 at one end thereof at a predetermined rate.

A combination mixing and advancing conveyor 22 is rotatably mounted within the trough 14 and driven by an electric motor or other prime mover 24. Since the speed of rotation of the conveyor 22 should be controlled and regulated, it is advisable that the motor 24 be of a variable speed type.

The conveyor 22 is in the form of a spiral or helix and the spiral vanes 26 thereof have a plurality of laterally bent wings or ears 28 thereon so that the pellets 12 are not only advanced along the trough 14 from the hopper 16, but are tumbled and agitated within the trough 14 throughout its length. Such action provides the proper mixing of the pellets 12 with the syrupy substance 10 emanating from overflow conduit 30, as well as with a powdery dust or meal 32 gravitating from a feeder therefor, designated by the numeral 34.

The substance 10 consists of sugar 36 and water that is directed into an open top vat 38 by way of line 40. Sugar 36 in granular form is fed into the open top of vat 38 by means of a suitable metering assembly broadly designated by the numeral 42. Manifestly, the rate of flow of the sugar 36 is controlled by proper adjustment of the metering assembly 42 in accordance with the rate of advancement of the pellets 12 along the trough 14, and other factors including the capacity of the conduit 30 and the thickness of the coating 44 to be applied to the coated pellet 46 shown in Figs. 2 and 3 of the drawing.

Manifestly, a controlled amount of water is directed into the vat 38 under pressure and its temperature should be elevated through heating means not herein shown, to increase the rate of dissolving sugar 36 in the vat 38. It is contemplated that the water flowing into the vat 38 under pressure at the bottom thereof, have a temperature of approximately 150° to 180° F., all depending of course, upon the temperature of the granular sugar 36 and the space in which the method is carried out. To further the speed of dissolving sugar 36 in vat 38, a steam coil 48 or other heating means in, below and/or around the vat 38 may be utilized to hold the temperature of the admixture in the vat 38 at about 80° to 110° Fahrenheit.

Still further, the provision of an agitator 50 in the vat 38 driven by a motor or other prime mover 52, prevents settling of the sugar 36 and enhances the quick dissolving of at least a substantial amount of the sugar, and the resulting solution or suspension overflows into the conduit 30 that communicates with the vat 38 near the top of the latter. It is to be preferred that the agitator 50 whirl the mixing materials in the direction of the arrows 54 and that the sugar 36 enters the vat 38 so as to be carried around substantially 360° prior to overflowing into conduit 30.

Other substances such as a preservative 56 may also be admixed in the vat 38 with the sugar and water by means of a flow-line 58 emanating from mechanism 60 for directing the same into the vat 38 under pressure at a predetermined rate.

It is highly essential to the formation of a coating 44 of sufficient thickness, uniformity and density, that the syrup 10 be very thick, heavy and viscid. To this end it is contemplated that there may be added as much as three parts sugar to one part water in the mixing vat 38. Because of this fact, it is not feasible or practical, if not virtually impossible to provide conventional structure to cause the syrup 10 to flow to a point of use. It cannot be easily and economically pumped or advanced with force by means of flow lines having pump means therein, and many problems arise when the syrup 10 is prepared and stored for subsequent use.

Accordingly, through the method hereof, wherein the syrup 10 is actually produced at the time coating is to take place, and at the site of the coating structure, the problems facing successful production of pellets 46, have been overcome. It is but necessary to use only enough water in the mixture to assure a free-flowing syrup that will overflow the vat 38 and gravitate to the tumbling pellets 12 without any other force or pressure therebehind to move the syrup 10 to the point of use. As soon as the pellets 12 fall into the trough 14, they are immediately agitated and tumbled by the action of the spiral conveyor 22, or other device and the pellets 12 are tumbled through the gravitating syrup 10 as they progress along the trough 14. The tumbling pellets 12 are thoroughly admixed with the syrup prior to being tumbled through the gravitating dust mixture 32 so that the pellets are completely covered with the syrup and will pick up an even, uniform coating of the dust. Accordingly, the sticky syrup 10 has formed a complete coating on the pellets 12 by the time they move through the dust 32 and the latter will cling to the viscid coating as the pellets and the dust 32 are further admixed by the advancing means 22 in the receiving means 14.

Trough 14 has an outlet chute 62 at that end thereof opposite to the prime mover 24 for receiving the coated pellets 46 and directing the same to a foraminous conveyor belt 64 within a drier broadly designated by the numeral 66. The pellets 46 are carried from the chute 62 through the drier 66 into a relatively thin layer as illustrated, and by means of a pair of opposed blower assemblies 68, hot air is directed through the layer of pellets 46 and the coating 44 is dried with the corn, flour or other substance 32 clinging thereto as shown in Figs. 2 and 3. The dried pellets 46 emanate from the drier 66 by means of an outlet chute 70.

Each of the blower assemblies 68 includes a fan 72 for directing air through a radiator 74 as shown by arrows 76. Steam is directed into and out of the coils not shown, of the radiators 74 by means of pipes 78 and 80 and the hot air is collected in a plenum 82 for ultimate discharge into hollow casings 84 carried by the drier 66 along the sides thereof. A plurality of openings 86 in the drier 66, receive the hot air as indicated by arrows 88 and such hot air travels upwardly through the foraminous conveyor 64 and through the layer of pellets thereon for discharge into outlet tubes 90. A suction fan not shown, is provided and utilized to draw the air from the drier 66 through the tubes 90.

Means for driving the conveyor 64 is not herein illustrated and may consist of any suitable prime mover operably coupled with a drive chain 92 that is in turn operably connected to the conveyor belt 64.

The spreading of the pellets 46 in a relatively thin layer within the drier 66; the provision of foraminous advancing means 64 for receiving air that is forced therethrough and through the layer of pellets 46; the forcing of the air through the drier 66 not only by use of fans 72 but by use of a suction fan; and the heating of the air prior to directing the same to the pellets 46 to be dried, constitute cooperable features of this invention which assure the formation of a relatively hard coating 44 on the pellets 12 which is not easily displaced from the pellets after the same emanate from the drier 66 during packaging and shipping operations, and while the same are being fed to domestic animals, fowl or the like. Manifestly, the speed of advancement of the pellets 46 along the drier 66 and the rate of air-flow through the drier 66 should be controlled to assure a sufficient drying of the granular coating 44 such that it will subsequently harden after packaging without the pellets binding together or the coatings 44 becoming displaced.

As above indicated, the nature of pellets 12 of itself has no particular bearing upon the method or on the ultimate product produced by following the method hereinabove described, and whether or not the dust food 32 is applied is subject to the desires of the manufacturer. It has been found that through employment of the method and by use of the apparatus hereinabove described for carrying out the method, the entire pellet 12 is thoroughly and completely covered with the coating 44, and such coating 44 is sufficiently thick as to assure a greatly increased palatability which of course, is the primary object of the invention.

While details of construction of the apparatus may be varied, and the steps of the method altered to some extent, such changes are within the spirit of the invention and it is, therefore, desired to be limited only by the scope of the appended claims setting forth the novel and essential characteristics of the invention as above described.

Having thus described the invention what is claimed as new and desired to be secured by Letters Patent is:

1. In apparatus for applying a uniform coating of a heavy viscid syrup to feed pellets including an elongated trough having a spiral mixing conveyor therein for continuously advancing and tumbling feed pellets delivered to said trough at one end thereof by a hopper and removed therefrom by a delivery chute, a hollow syrup vat having the uppermost end thereof disposed above said trough; a metering assembly above the vat for continuously feeding sugar to the vat at the top thereof; a conduit at the bottom of the vat for directing heated water under pressure into the vat; an agitator in the vat for mixing the sugar and water to form a viscid syrup, said agitator being disposed to whirl the sugar-water mixture in the vat; and an overflow conduit at the top of the vat and having a discharge end above the conveyor intermediate said hopper and said chute for gravitational delivery of said viscid syrup to the advancing and tumbling pellets whereby the same are coated, said assembly being disposed for movement of the sugar in the vat in a direction away from the overflow conduit.

2. In apparatus for applying a uniform coating of a heavy viscid syrup to feed pellets including an elongated trough having a spiral mixing conveyor therein for continuously advancing and tumbling feed pellets delivered to said trough at one end thereof by a hopper and removed therefrom by a delivery chute, a hollow syrup vat having the uppermost end thereof disposed above said trough; a metering assembly above the vat for continuously feeding sugar to the vat at the top thereof, said assembly including adjustable means for regulating the flow of sugar to said vat; a conduit at the bottom of the vat for directing heated water under pressure into the vat; an agitator in the vat for mixing the sugar and water to form a viscid syrup, said agitator being disposed to whirl the sugar-water mixture in the vat; and an overflow conduit at the top of the vat and having a discharge end above the conveyor intermediate said hopper and said chute for gravitational delivery of said viscid syrup to the advancing and tumbling pellets whereby the same are coated, said assembly being disposed for movement of the sugar in the vat in a direction away from the overflow conduit.

3. In apparatus for applying a uniform coating of a heavy viscid syrup to feed pellets including an elongated trough having a spiral mixing conveyor therein for continuously advancing and tumbling feed pellets delivered to said trough at one end thereof by a hopper and removed therefrom by a delivery chute, a hollow syrup vat having the uppermost end thereof disposed above said trough; a metering assembly above the vat for continuously feeding sugar to the vat at the top thereof, said assembly including adjustable means for regulating the flow of sugar to said vat; a conduit at the bottom of the vat for directing heated water under pressure into the vat; an agitator in the vat for mixing the sugar and water to form a viscid syrup, said agitator being disposed to whirl the sugar-water mixture in the vat; an overflow conduit at the top of the vat and having a discharge end above the conveyor intermediate said hopper and said chute for gravitational delivery of said viscid syrup to the advancing and tumbling pellets whereby the same are coated, said assembly being disposed for movement of the sugar in the vat in a direction away from the overflow conduit; and a steam coil located beneath said vat for maintaining the syrup at a predetermined temperature.

4. In apparatus for applying a uniform coating of a heavy viscid syrup to feed pellets including an elongated trough having a spiral mixing conveyor therein for continuously advancing and tumbling feed pellets delivered to said trough at one end thereof by a hopper and removed therefrom by a delivery chute, a hollow syrup vat having the uppermost end thereof disposed above said trough; a metering assembly above the vat for continuously feeding sugar to the vat at the top thereof, said assembly including adjustable means for regulating the flow of sugar to said vat; a conduit at the bottom of the vat for directing heated water under pressure into the vat; an agitator in the vat for mixing the sugar and water to form a viscid syrup, said agitator being disposed to whirl the sugar-water mixture in the vat; an overflow conduit at the top of the vat and having a discharge end above the conveyor intermediate said hopper and said chute for gravitational delivery of said viscid syrup to the advancing and tumbling pellets whereby the same are coated, said assembly benig disposed for movement of the sugar in the vat in a direction away from the overflow conduit; and a conduit for delivering a preservative to the sugar-water mixture in the vat.

5. In apparatus for applying a uniform coating of a heavy viscid syrup to feed pellets, an elongated trough; a hopper at one end of the trough for delivering the pellets thereto, said hopper having means therein for regulating the flow of pellets to said trough; a spiral mixing conveyor in the trough for continuously advancing and tumbling the pellets directed thereto; an outlet chute at the other end of said trough for removing the coated pellets therefrom; a hollow syrup vat having the uppermost end thereof disposed above said trough; a metering assembly disposed for continuously feeding granular sugar to the vat at the top thereof; a conduit at the bottom of the tank for directing heated water under pressure into the vat; an agitator in the vat for mixing the sugar and water, said agitator being disposed to whirl the sugar-water admixture; an overflow conduit at the top of the vat and having a discharge end above the conveyor intermediate said hopper and said chute for gravitational delivery of viscid syrup to said advancing and tumbling pellets whereby the same are coated, said assembly being disposed for movement of the sugar in the vat in a direction away from the overflow conduit; and a feeder mounted above said conveyor between said discharge end and said chute for dusting the coated pellets with a powder.

6. The method of producing syrup coated feed pellets comprising the steps of continuously feeding granular sugar into the top of a suitable syrup vat at a predetermined rate; continuously directing water at a temperature within the range of 150° F. to 180° F. into the lowermost end of the tank at a predetermined rate; agitating the sugar and water to thoroughly admix the same, the rates at which the sugar and water are introduced into the vat being so correlated that at a temperature within the range of 80° F. to 110° F., a heavy viscid syrup is formed at the uppermost end of the vat and which overflows the vat; maintaining the syrup at the uppermost end of the vat within said range of 80° F. to 110° F.; and advancing and tumbling feed pellets through the overflowing syrup to uniformly coat the pellets with the syrup.

References Cited in the file of this patent

UNITED STATES PATENTS

| | | |
|---|---|---|
| 781,406 | Devereux | Jan. 31, 1905 |
| 1,796,031 | Kent | Mar. 30, 1931 |
| 1,945,918 | Schmidt | Feb. 6, 1934 |
| 2,073,779 | Bramsen | Mar. 16, 1937 |
| 2,179,246 | Applebaum | Nov. 7, 1939 |
| 2,279,106 | Brown | Apr. 7, 1942 |
| 2,550,288 | North | Apr. 24, 1951 |
| 2,703,304 | Paladino | Mar. 1, 1955 |